US008353407B2

(12) United States Patent
Steadman

(10) Patent No.: US 8,353,407 B2
(45) Date of Patent: Jan. 15, 2013

(54) APPARATUS AND METHOD FOR MAKING WIRE SCREEN

(75) Inventor: Erich Steadman, Williamsville, NY (US)

(73) Assignee: Buffalo Wire Works Company, Buffalo, NY (US)

( * ) Notice: Subject to any disclaimer, the term of this patent is extended or adjusted under 35 U.S.C. 154(b) by 272 days.

(21) Appl. No.: 12/460,612

(22) Filed: Jul. 22, 2009

(65) Prior Publication Data

US 2011/0220555 A1 Sep. 15, 2011

(51) Int. Cl.
*B29C 47/00* (2006.01)

(52) U.S. Cl. ..... 209/400; 209/401; 156/60; 156/244.12; 156/390

(58) Field of Classification Search .................. 156/166, 156/167, 180, 296, 245, 242; 209/400, 401
See application file for complete search history.

(56) References Cited

U.S. PATENT DOCUMENTS 2,061,850 A * 11/1936 Roberts ......................... 210/490
2,895,535 A 7/1959 Ono
3,252,263 A 5/1966 Korf
3,459,615 A * 8/1969 Eilerman ...................... 156/181
3,632,463 A * 1/1972 McFarlane .................... 425/113
4,120,785 A 10/1978 Kanamori et al.
4,247,007 A 1/1981 Kai
4,295,918 A 10/1981 Benson et al.
4,819,809 A 4/1989 Derrick
4,857,176 A 8/1989 Derrick et al.
5,332,462 A 7/1994 Myers
5,417,793 A 5/1995 Bakula
6,269,953 B1 8/2001 Seyffert et al.
6,305,549 B1 10/2001 Riddle et al.
6,450,345 B1 9/2002 Adams et al.
7,306,022 B2 12/2007 Hughes et al.
2004/0103979 A1 * 6/2004 Kramer ......................... 156/167
2004/0251175 A1 12/2004 Adams et al.

* cited by examiner

*Primary Examiner* — Joseph C Rodriguez
(74) *Attorney, Agent, or Firm* — Simpson & Simpson, PLLC

(57) ABSTRACT

A method of making a screen with an apparatus, the screen including a plurality of wires arranged in a patterned configuration, the apparatus including an extruder and a mold, the method including (a) longitudinally aligning the plurality of wires in the apparatus in a first direction only and arranging the wires in the patterned configuration, (b) applying a first bead of molten material on the wires via the extruder, and (c) directly molding the first bead of molten material into a support member for the screen by closing the mold about the bead, wherein the support member at least partially encases at least one of the wires.

5 Claims, 10 Drawing Sheets

APPARATUS AND METHOD FOR MAKING WIRE SCREEN

FIELD OF THE INVENTION

The invention relates to an apparatus and method for making wire screens, particularly self-cleaning wire screens.

BACKGROUND OF THE INVENTION

Machines to separate differently sized particles, such as aggregate shakers, sifters, or vibrating screeners are well known in the art, particularly for construction, industrial, and other related applications. These machines include vibrating decks which receive wire screens for separating larger sized particles from smaller sized particles, by shaking loads of aggregate, rocks, dirt, and related material through one or more screens. The screens may have openings arranged to sort particle sizes from a fraction of an inch to several inches, as needed. A single shaker may include a plurality of generally vertically stacked screens for simultaneously separating multiple sizes from the same load of material. Due to the harsh conditions under which the screens are used, the screens have to be replaced regularly. Traditional screens generally comprise two sets of wires woven perpendicularly together.

To increase the lifespan and decrease the required maintenance of wire screens, self-cleaning screens are also now commonly used. The self-cleaning screens generally include wires which extend in a single longitudinal direction, with a support means to hold the wires in alignment. Thus, each wire can vibrate at its own frequency and the wires can separate from each other, so that rocks or debris will be shaken loose from the screen and the screen will not easily blind or clog. That is, due to the individually vibrating wires, self-cleaning screens do not experience the same level of build-up or blinding as do traditional woven screens.

The support means for some self-cleaning screens comprise small groups of perpendicularly woven wires, which act to support the screen at intervals along the screen. However, the metal-on-metal contact caused by the woven wires increases wear on the screen at the woven sections and decreases the lifespan of the screens. To increase the flexibility and lifespan of the screens, other self-cleaning screens may include a strip of a polymer material formed about and around the groups of perpendicularly woven wires. The polymer support strips are generally made by placing two pre-formed polymer bars or strips, one above the wires and one below, and then welding them together by heating the bars. Although this fuses the two bars together, support members made in this way still suffer from delamination or general weakness at the interface where the two bars are welded together. Even when polymer support strips are used, the perpendicularly woven wires are often required to first also be included, so that the woven wires hold the longitudinal wires of the screen in the final configuration while the polymer strips are formed. Screens which include both a polymer strip and perpendicularly woven wires require additional time, material, and cost to manufacture than traditional screens. Without the pre-weaving, some other means would be required to at least temporarily hold the wires in the screen's final configuration.

As a result, self-cleaning screens are desired that include the benefits of polymer support members, but not the shortcomings of woven perpendicular wires, and which take less time, material, and cost to manufacture than screens which include both woven wires and polymer support strips. Thus, what is, needed a method an apparatus for creating a self-cleaning screen which includes polymer support means and which does not require pre-weaving of other wires, and does not require pre-formed polymer bars or strips.

BRIEF SUMMARY OF THE INVENTION

The present invention broadly comprises a method of making a screen, the screen including a plurality of wires arranged in a patterned configuration, the method including (a) longitudinally aligning the wires in a first direction only and arranging the wires in the patterned configuration, (b) applying a bead of molten material on the wires, and (c) directly molding the bead of molten material into a support member, wherein the support member at least partially encases at least one of the wires. In one embodiment the bead is applied on the wires along a path defined in a second direction, wherein the second direction is transverse to the first direction, and wherein the support member is a support strip for fixing the wires in the patterned configuration. In another embodiment, the bead is applied on the wires along a path defined in the first direction, wherein the support member is a lap for the wire screen, and wherein the lap at least partially encases at least one peripheral wire in the plurality of wires. In one embodiment, the patterned configuration is a diamond, herringbone, triangle, or harp style pattern. In another embodiment, after molding the support strip in step (c), steps (a)-(c) are generally repeated for forming at least one subsequent support strip.

The current invention also broadly comprises a method of making a screen with an apparatus, the screen including a plurality of wires arranged in a patterned configuration, the apparatus including an extruder and a mold, the method comprising: (a) longitudinally aligning the plurality of wires in the apparatus in a first direction only and arranging the wires in the patterned configuration, (b) applying a first bead of molten material on the wires via the extruder, and (c) directly molding the first bead of molten material into a support member for the screen by closing the mold about the bead, wherein the support member at least partially encases at least one of the wires. In one embodiment, the extruder applies the bead to the wires along a path defined in a second direction, wherein the second direction is transverse to the first direction, and wherein the support member is a support strip for fixing the wires in the patterned configuration. In another embodiment, the bead is applied on the wires along a path defined in the first direction, wherein the support member is a lap for the wire screen, and wherein the lap at least partially encases at least one peripheral wire in the plurality of wires.

In one embodiment, the apparatus includes a plurality of pins, and wherein the wires engage between the pins for longitudinally aligning the wires in the first direction and arranging the wires in the patterned configuration in step (a). In a further embodiment, wherein the apparatus further includes a clamp located proximate the pins for temporarily fixing the wires in the patterned configuration when the clamp is engaged about the wires, and wherein after step (c) the method further comprises: (e) indexing the wires from a first position to a second position by moving at least one of the clamp or the mold in the first direction, wherein during moving of the at least one of the clamp or the mold, the at least one of the clamp or the mold is closed about the wires for pulling the wires in the first direction from the first position to the second position. In a further embodiment, wherein the mold is closed about the bead and moved in the first direction for indexing the wires in step (e), the method further comprises: (f) retracting the pins for disengaging the pins from the wires at the first position, (g) resetting the clamp to an initial position, (h) redeploying the pins for re-engaging with the wires at the second position, and (i) releasing the support strip by opening the mold. In yet a further embodiment, after step (i), at least one subsequent support strip is formed by generally repeating steps (a)-(i) for each subsequent support strip.

The current invention also broadly comprises a method of making a screen with an apparatus, the screen including a plurality of wires, the apparatus including a plurality of pins, the method comprising: (a) engaging the wires between the pins, wherein the engaging of the wires with the pins longitudinally aligns the wires in a first direction only and arranges the wires in a patterned configuration, and (b) encasing the wires in a support member for fixing the wires in the patterned configuration. In one embodiment, the pins are arranged in at least one row, wherein the at least one row is arranged in a second direction, and wherein the second direction is transverse to the first direction. In another embodiment, the pins are retractable for disengaging from the wires, so the wires can be removed from the apparatus or repositioned from a first position to a second position with respect to the apparatus, and wherein the pins are deployable so the pins can re-engage with the wires at the second position after repositioning the wires.

The current invention also broadly comprises an apparatus for making a screen, the screen having a plurality of wires arranged in a patterned configuration, wherein the wires are longitudinally aligned in a first direction only, the apparatus comprising: an extruder for applying a bead of molten material on the wires, and a mold for directly forming the bead of molten material into a support member, wherein the support member at least partially encases at least one of the wires. In one embodiment, the extruder applies the bead along a path defined in a second direction, wherein the second direction is transverse to the first direction, and wherein the support member is a support strip for fixing the wires in the patterned configuration. In another embodiment, the extruder applies the bead along a path defined in the first direction, wherein the support member is a lap for the wire screen, and wherein the lap at least partially encases at least one peripheral wire in the plurality of wires. In another embodiment, the apparatus further comprises a plurality of pins arranged to engage the wires for longitudinally aligning the wires in the first direction only and arranging the wires in the patterned configuration. In one embodiment, the pins are retractable for disengaging from the wires, so the screen can be removed from the apparatus or repositioned from a first position to a second position with respect to the apparatus, and wherein the pins are re-deployable for re-engaging the pins with the wires at the second position.

The current invention also broadly comprises an apparatus for making a screen, the screen including a plurality of wires arranged in a patterned configuration, the apparatus including a plurality of pins, wherein the pins are operatively arranged to engage with the wires for longitudinally aligning the wires in a first direction only and arranging the wires in the patterned configuration of the screen. In one embodiment, the pins are retractable for disengaging from the wires, so the screen can be removed from the apparatus or repositioned from a first position to a second position with respect to the apparatus, and wherein the pins are re-deployable for re-engaging the pins with the wires at the second position after repositioning the wires. In another embodiment, the pins protrude from a pin block of the apparatus, and the pins are arranged in at least one row, wherein the at least one row is arranged in a second direction, and wherein the second direction is transverse to the first direction.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
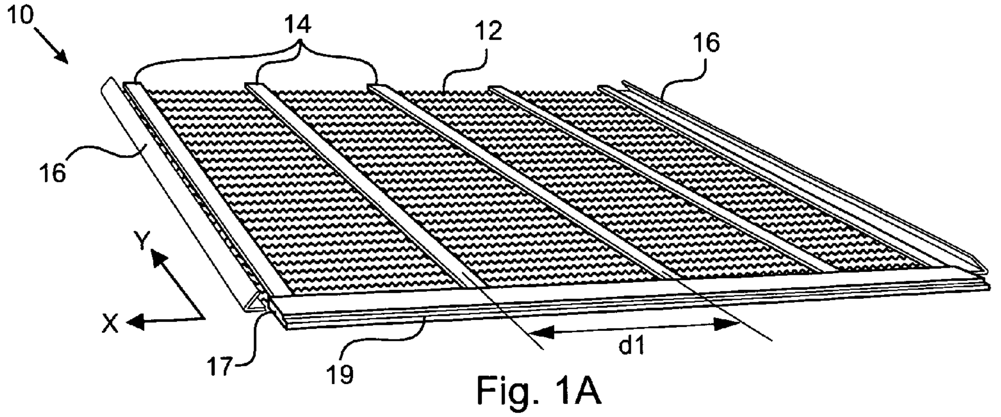
FIG. 1A is a perspective view of a screen made according to the current invention method.

Referring now to the drawings, FIG. 1A illustrates wire screen 10 which is one embodiment of screen that can be manufactured by the current invention method. Wire screen 10 is a self-cleaning screen, and accordingly includes wires 12 which are longitudinally arranged along the x-axis only.

The wires are crimped and arranged so that it has a pattern that generally resembles a typically woven screen. That is, the wires are arranged so that adjacent wires form diamond shaped openings 15A. Support strips 14 are included to, support the wires and are oriented perpendicular to the direction of the wires, as indicated by the y-axis. Each support strip is preferably spaced distance d1 from adjacent support strips. Screen 10 includes hooked ends 16 which engage with correspondingly bent receiving structures on the decks of the shaker machines into which the screens are intended to be installed. When installed in a shaker machine, the support strips are preferably aligned so that they arrange with and over the support beams or bars of the deck of the shaker machine.

Figure 1B:
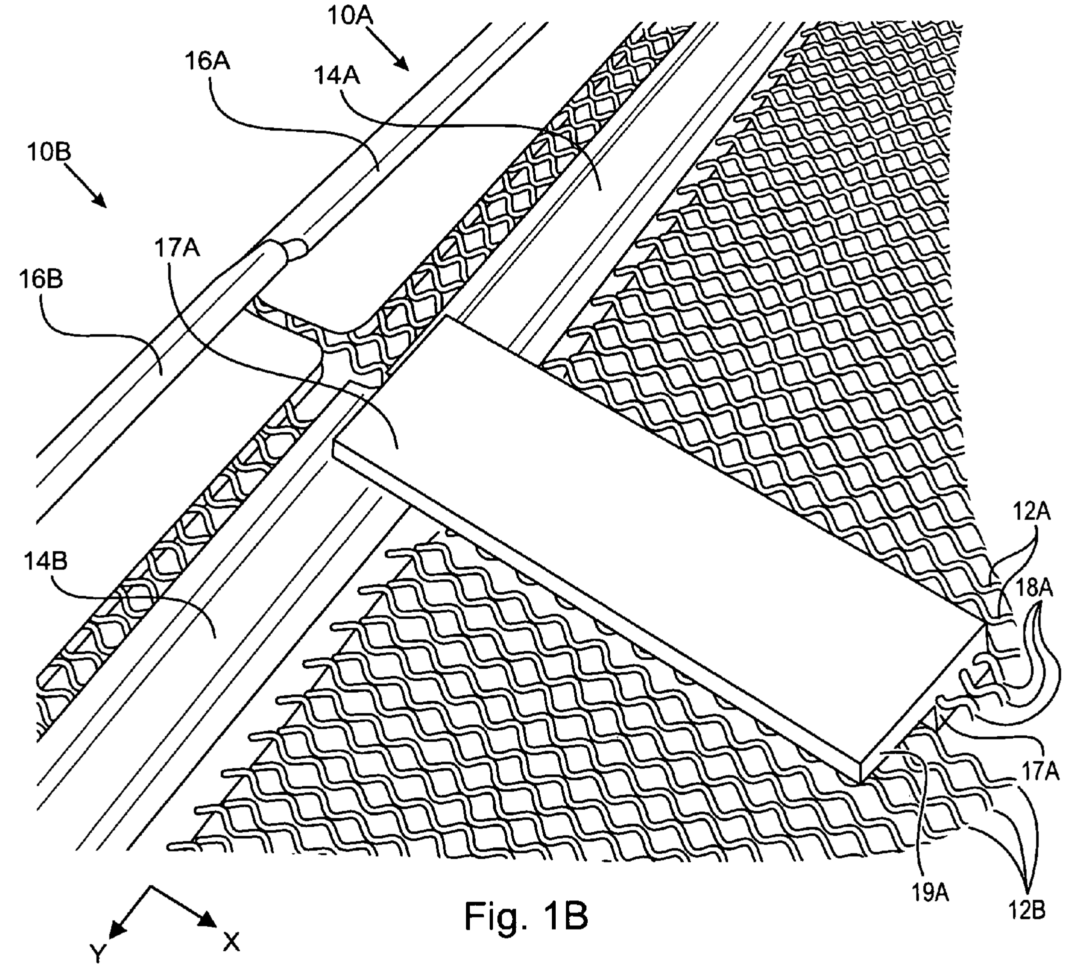
FIG. 1B is a partial perspective view illustrating a lap on a first screen overlapping a second screen with a portion of the lap cutaway.

Large industrial shakers are designed to receive more than one screen at a time. To minimize the probability of extraneous material getting through a gap located between two adjacent screens, each screen may include a lap for covering any potential gaps between two screens. Two screens designated 10A and 10B are illustrated, which are substantially identical to screen 10, are shown in FIG. 1B. However, for identification purposes, elements of screen 10A are additionally designated with the letter A and elements of screen 10B with the letter B after the corresponding reference numeral. Thus, screen 10A includes lap 17A which is formed about peripheral wires 18A, and orientated in the x-direction, parallel to the longitudinal direction of the wires. Lap 17A is shown cutaway to reveal three peripheral wires 18A encased by the lap. Lap 17A includes flange 19A which overlaps wires 12B of screen 10B for covering any gaps which may be created between screen 10A and 10B.

Figure 2A:
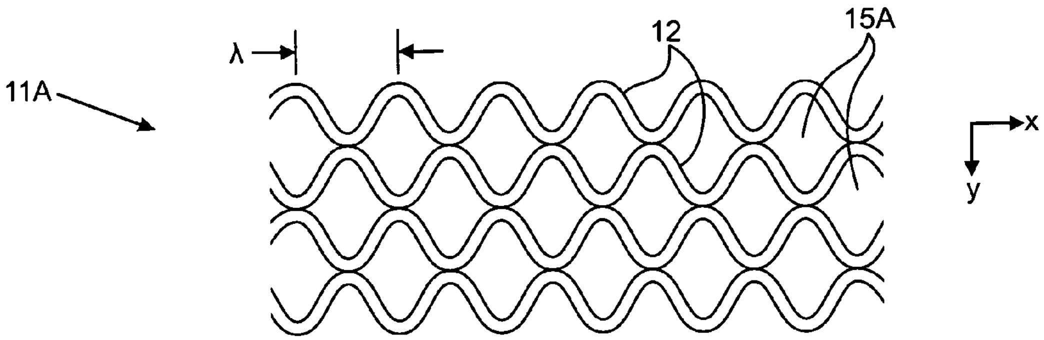
FIG. 2A is a diamond style pattern for a screen.
Figure 2B:
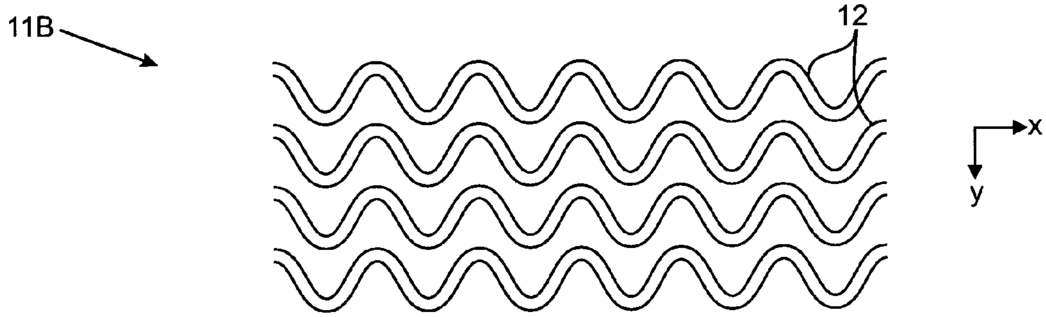
FIG. 2B is a herringbone style pattern for a screen.
Figure 2C:
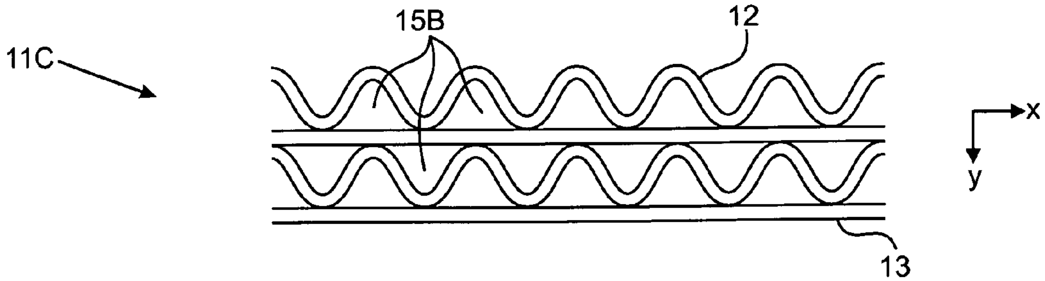
FIG. 2C is a triangle style pattern for a screen.
Figure 2D:
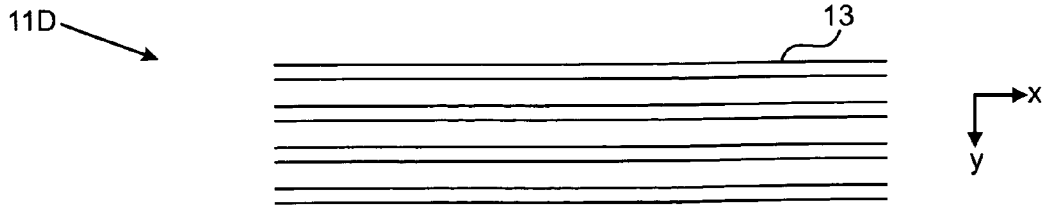
FIG. 2D is a harp style pattern for a screen.

FIGS. 2A-2D show several possible embodiments of wire screens having different configurations. Diamond pattern 11A is shown in FIG. 2A including crimped wires 12, which are arranged out of phase with respect to each other. By "out of phase," it is meant that each crimped wire generally resembles an undulating wave having a wavelength λ, and that every other wire is shifted by one-half wavelength, so that the crimps of adjacent wires are misaligned and touch. This arrangement results in diamond-shaped openings 15A. Herringbone pattern 11B includes crimped wires 12 arranged such that the wires are aligned in phase. By "in phase," it is meant that the crimps are aligned and do not touch, unlike the diamond pattern. Triangle pattern 11C includes alternating crimped wires 12 and straight wires 13, for forming triangle-shaped openings 15B. Harp pattern 11D includes only straight wires 13 and no crimped wires. It can be seen that the wires in each pattern are arranged in only a single longitudinal direction. It should be understood that these are only four examples of possible configurations for screen 10, and that other configurations with varying styles and layouts of wires are possible according to the current invention method. Despite the repeating nature of the above exemplary configurations, the term "pattern" does not necessarily require repetition, and any pattern, including one created by randomly arranging different wires would also be within the scope of the current invention. Screen 10 will be shown throughout the Figures always utilizing diamond pattern 11A.

Apparatus 20 is arranged to perform the current invention method of manufacturing wire screens. Apparatus 20 is shown in front, rear, and side views, respectively, in FIGS. 3-6. Apparatus 20 generally includes framing 22 which supports a pair of parallel rails 24 arranged in the x-direction, and beam 26 in the y-direction. Track 27 is generally formed along beam 26, and may simply be the front surface of the beam, or include a protrusion or protrusions for defining the track. By "in the x-direction" or "along the x-axis," it is meant generally along or parallel to the corresponding x-axis shown in the Figures. By "in the y-direction" or "along the y-axis," it is meant generally along or parallel to the corresponding y-axis shown in the Figures. If a positive direction is specified herein, it means in the direction indicated by the arrowhead of the corresponding axis. A negative direction indicates the direction opposite the positive direction, namely, a 180 degree difference. If no positive or negative direction is specified, it generally means in both or either direction. The x-axis and y-axis are perpendicular with respect to each other.

Clamp 28, mold 30, and screen support 32 are included between rails 24, and are moveable along rails 24 in the positive and negative x-directions. Throughout FIGS. 3-6, clamp 28 and mold 30 are generally shown in their respective open positions. In one embodiment, the movement of clamp 28, mold 30, and/or screen support 32 is achieved by use of threaded rods 33 contained in and along each rail, with each rod part of a corresponding ball screw mechanism. The rods are preferably actuated by a single motor with appropriate couplings to simultaneously drive both-threaded rods. Extruder 34 includes a nozzle 36 and is mounted on beam 26 and moveable along track 27 in the positive and negative y-directions. In the shown embodiment, hopper 37 stores plastic pellets to be fed to extruder 34, such as by a vacuum or pressurized air system through hoses 38 and directed into the extruder by funnels 39.

Figure 4:
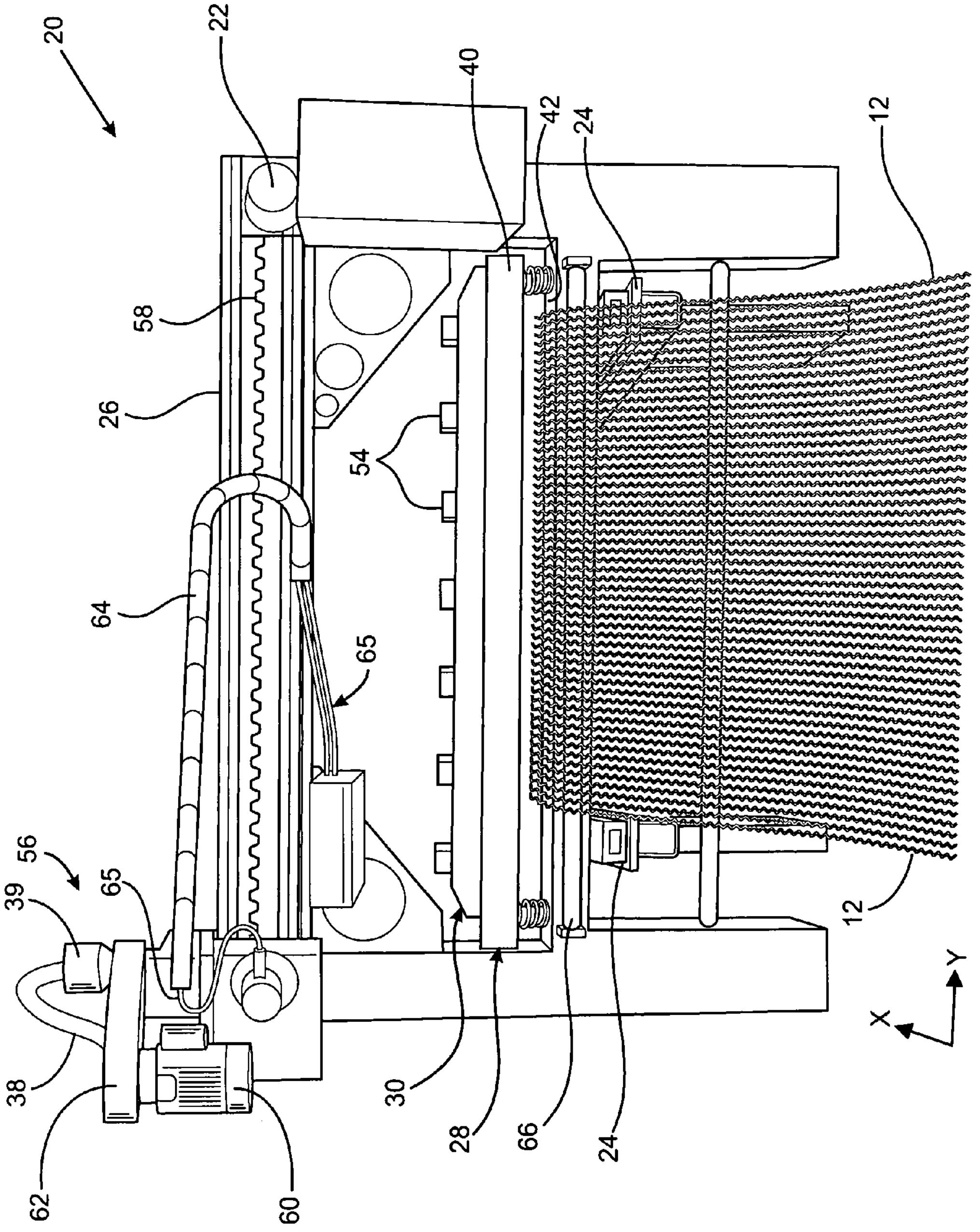
FIG. 4 is a rear view of the apparatus shown in FIG. 3.
Figure 5:
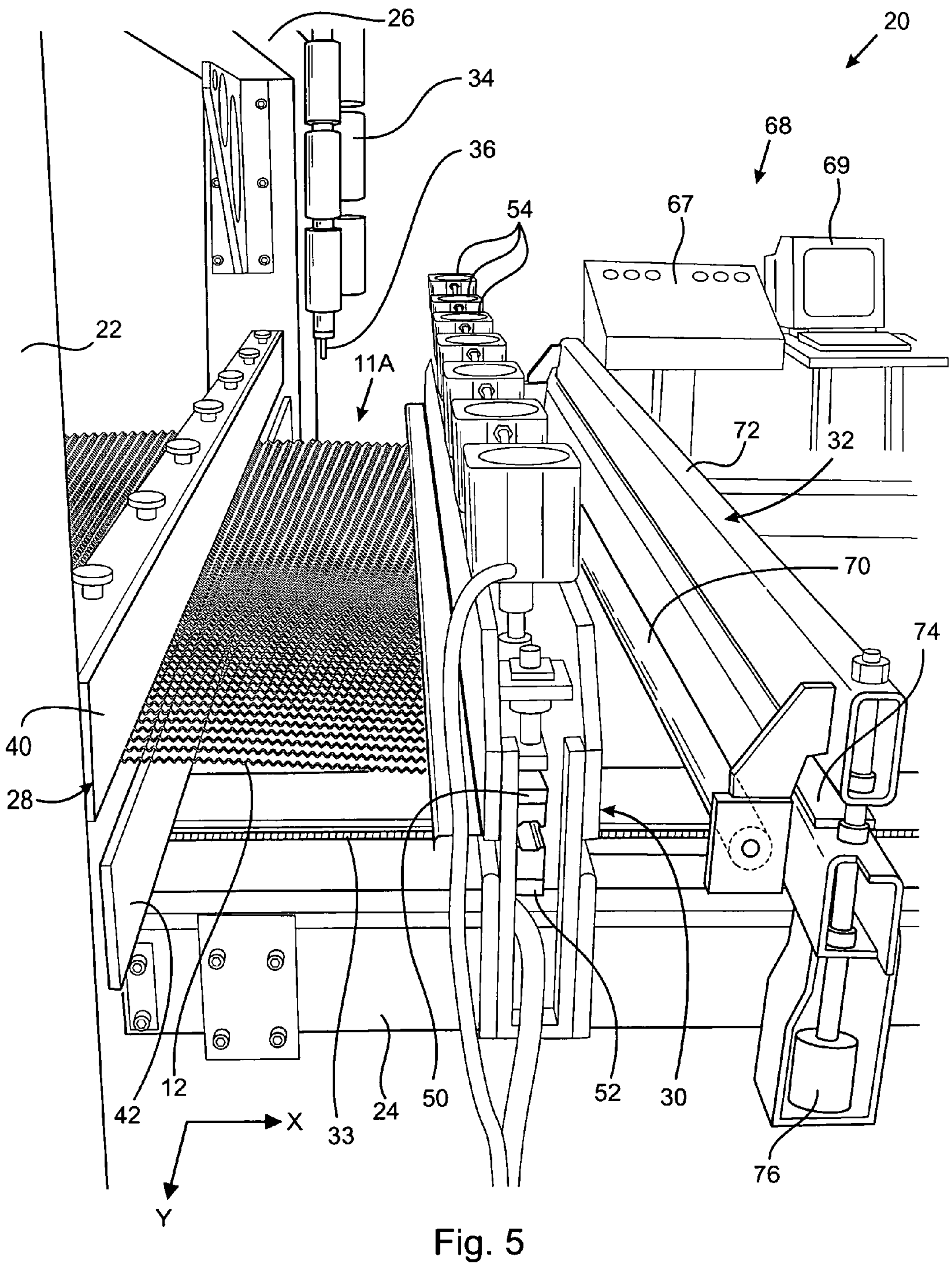
FIG. 5 is a left side view of the apparatus shown in FIG. 3.
Figure 6:
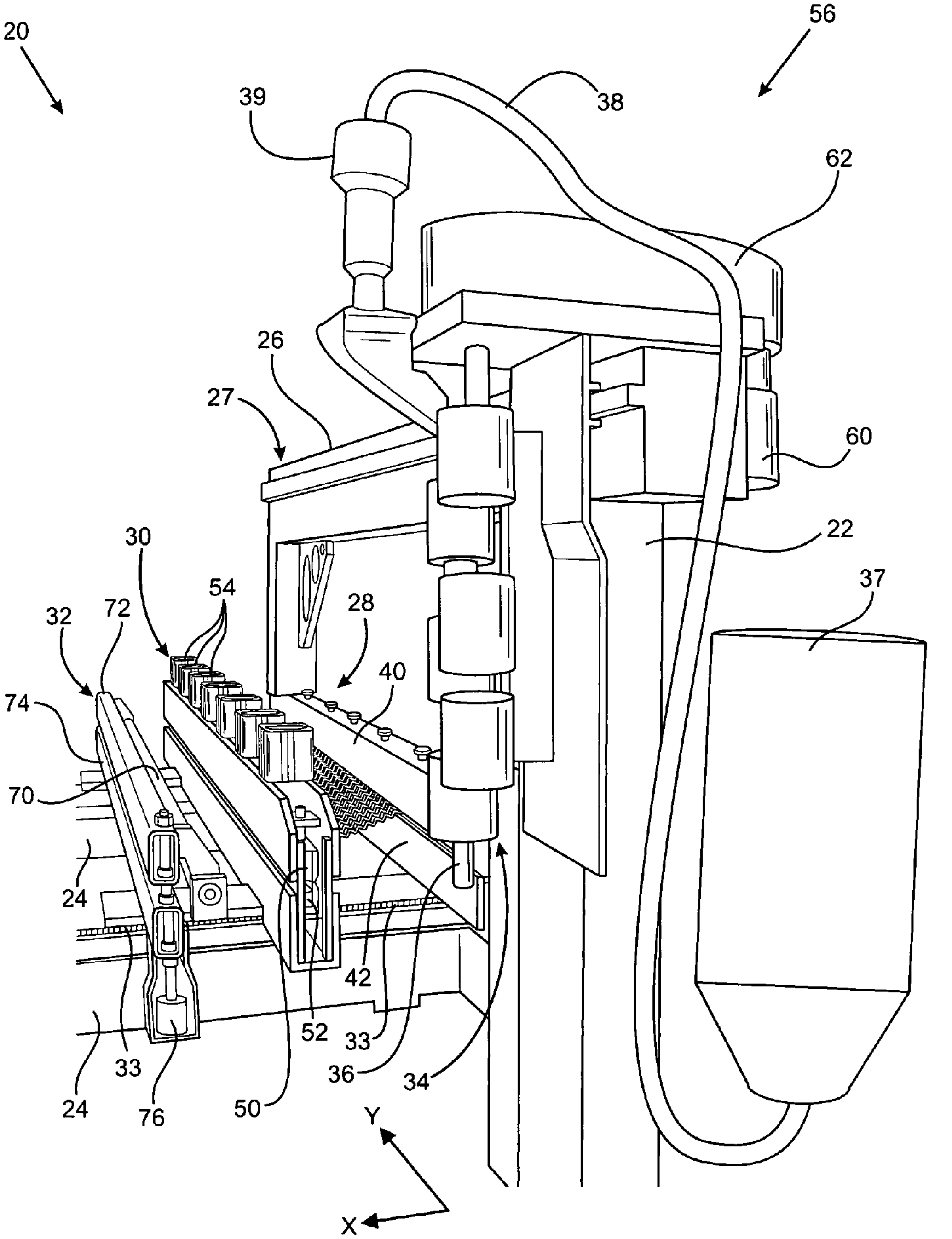
FIG. 6 is a right side view of the apparatus shown in FIG. 3.

Apparatus 20 is shown from the rear in FIG. 4 before the formation of any support strips, so that the majority of wires 12 are extending out of the rear of the apparatus. Support bar or roller 66 is located proximate to clamp 28 on the rear side of the apparatus for supporting the wires, and urging them into a generally horizontal orientation for better engagement between the jaws of the clamp.

Figure 7A:
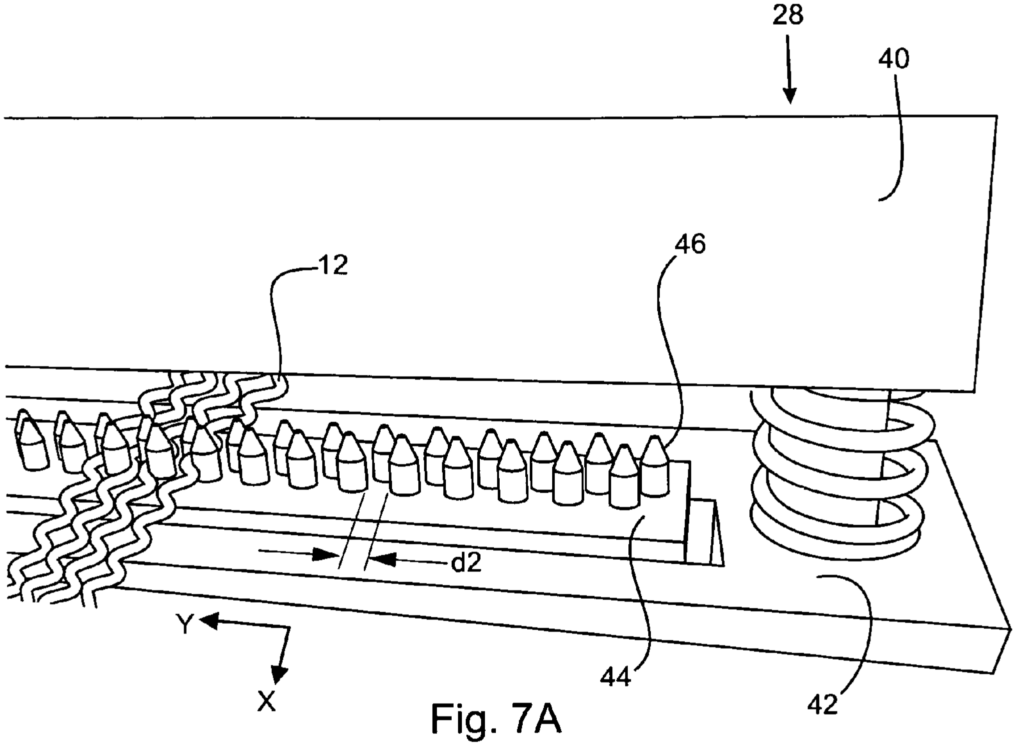
FIG. 7A is an enlarged view illustrating a pin block having a plurality of pins engaged with a sample of wires.
Figure 7B:
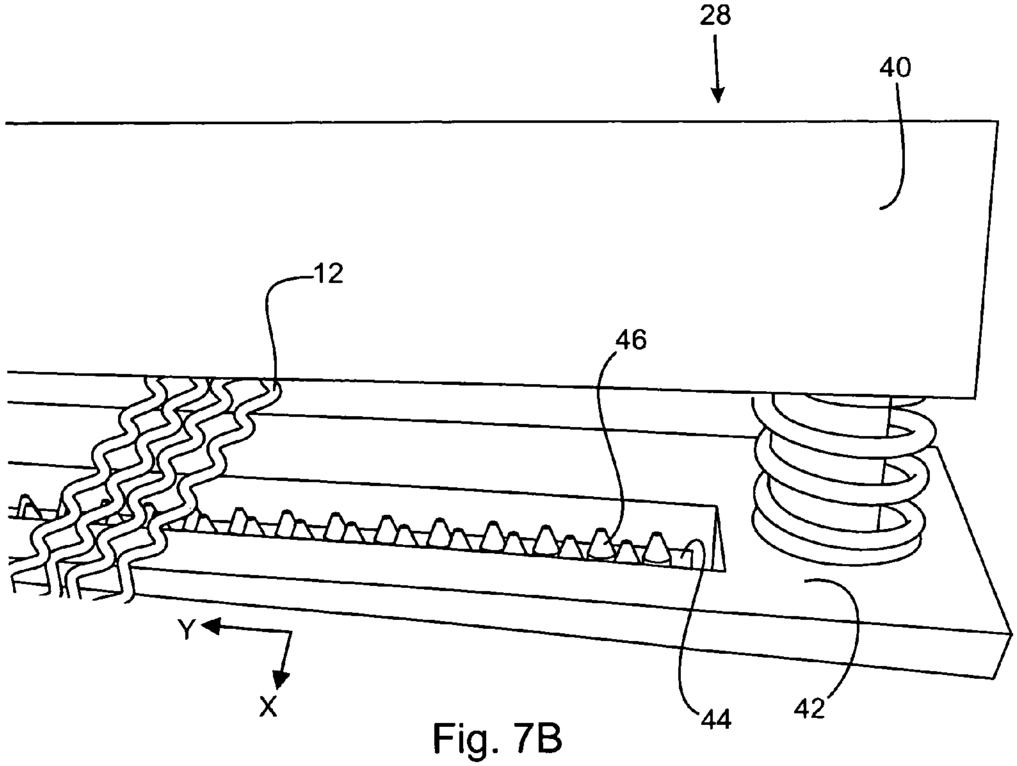
FIG. 7B is an enlarged view illustrating the pin block of FIG. 7A in a retracted position, disengaged from the wires.

Referring now also to FIGS. 7A and 7B, clamp 28 includes upper jaw 40 and lower jaw 42. Pin block 44 is secured in lower jaw 42. The pin block includes a plurality of pins 46 protruding upwards from the block. The upper jaw may include a corresponding block (not shown) which includes apertures to receive the pins, so that the upper jaw can clamp down tightly on the lower jaw. In FIG. 7A, a sampling of wires 12 can be seen installed about pins 46. The pins are arranged and spaced in the pin block so that when the wires are engaged with the pins, the pins properly align the wires in the desired final configuration of the screen. In the shown embodiment, the pins are shown in two rows, staggered with respect to each other, where the pins are equally spaced apart from each other by distance d2. The distance d2 is defined such that the pins will generally hold the wires into the final desired configuration for the screen. For the shown embodiment pins used to create diamond pattern 11A, distance d2 is approximately equal to twice the diameter or gauge of the wires, because two wires much fit between each pair of adjacent pins. A similar distance of approximately two wire diameters would be used for triangle pattern 11C, while only approximately one diameter would be utilized for a distance between pins in an apparatus arranged to create herringbone or harp style screens. Advantageously, this forces the wires into alignment so that the wires exhibit the final configuration of the screen when engaged between pins 46. In the shown embodiment, the tops of the pins are tapered to facilitate the engagement of the wires with the pins.

In one embodiment, the pins are retractable, so that the screen can be removed from the apparatus, or repositioned with respect to the apparatus for the formation of subsequent support strips, as will be discussed in move detail infra. As shown in FIG. 7B, the entire pin block may be arranged so that it can drop into lower jaw 42, effectively retracting pins 46 from wires 12, as shown. When the screen is moved, or wires of a new screen arranged in apparatus 20, the pins are redeployed so that they can engage with the wires again.

In one embodiment, pins 46 are built directly into clamp 28 as a permanent part of clamp 28. However, according to the shown embodiments providing the pins in a pin block enables the entire pin block to be removable from the clamp. In this way, pin blocks having varying designs of pins can be readily exchanged in clamp 28 so that apparatus 20 is adaptable to receive any combination of straight, crimped, or other styles of wires, as needed, by switching which pin block is installed in the apparatus. For example, if apparatus 20 were adapted to make a harp style screen (including harp pattern 11D shown in FIG. 2D) then the corresponding pin block may have only a single row of pins, with each pin spaced a distance equal to the diameter of the wire from adjacent pins, for aligning the wires in straight rows, as required by harp pattern 11D.

Extruder 34 is mounted on carriage 56, which is moveable down the length of beam 26 along track 27. In the shown embodiment, the carriage is mounted above the beam and on front and rear opposite sides of beam 26. In the shown embodiment, carriage 56 traverses the length of the beam by use of a motorized pinion gear (hidden) that is engaged with rack 58. It should be appreciated that other means of mobilizing carriage 56 could be substituted for a rack and pinion, such as a continuous chain drive, or the like. In one embodiment, extruder 34 is a screw type extruder which liquefies solid pellets into a viscous molten state by submitting the pellets to increased heat and pressure due to the rotation and operation of the screw. In the shown embodiment, the screw is powered by motor 60 via a belt, which is held under belt guard 62. Articulated cover 64 provides flexible protection and support for wires and cables 65 which run to the extruder carriage, which enables the cables to move with the carriage as it traverses beam 26, without a risk of entanglement of or damage to the wires.

Figure 8A:
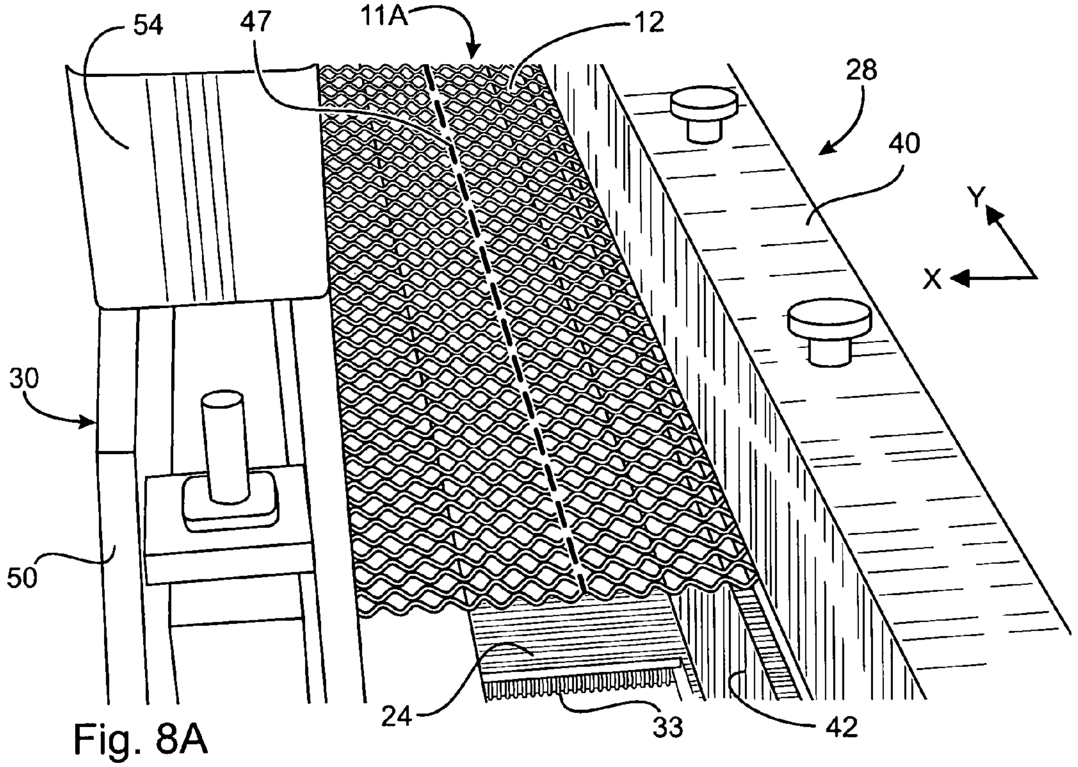
FIG. 8A is an enlarged view of a plurality of wires arranged in a diamond pattern in the apparatus shown in FIG. 3.
Figure 8B:
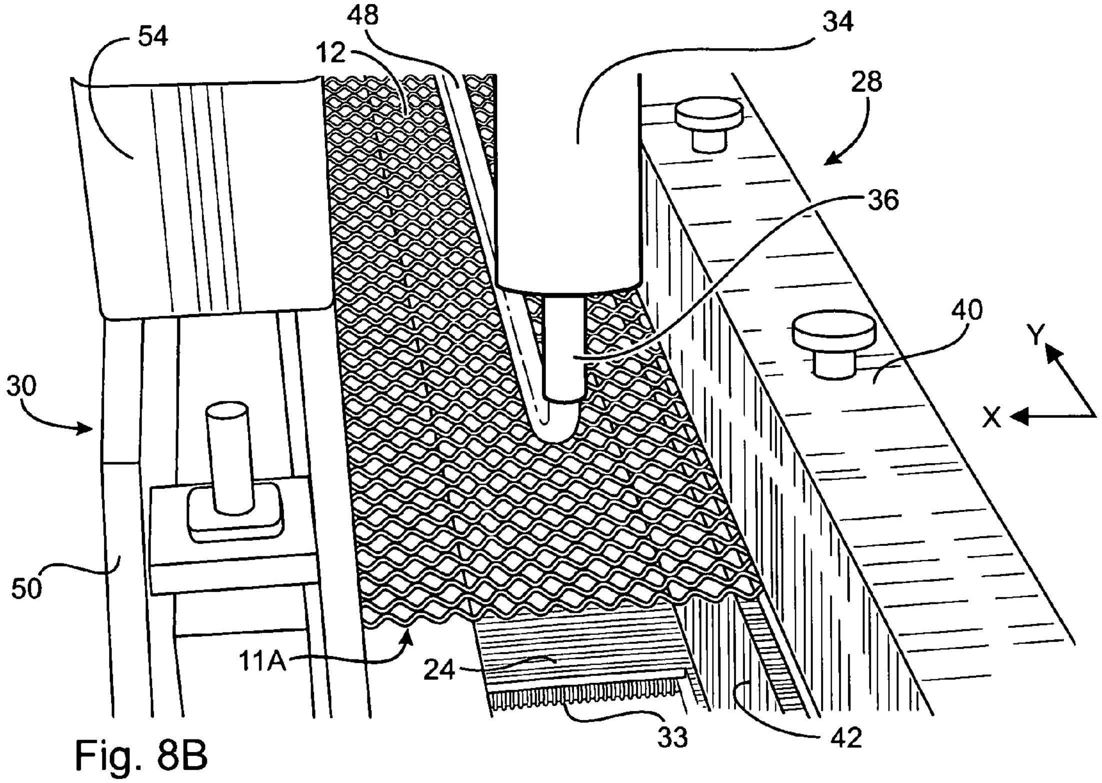
FIG. 8B is substantially the same view shown in FIG. 8A, illustrating the extrusion of a bead of molten material on the wires.

FIG. 8A shows an enlarged view of wires 12 secured in place by clamp 28 after being engaged between pins 46 of pin block 44. It can be seen that the pin block and clamp ensure that the wires exhibit the final configuration of screen 10; diamond pattern 11A in the illustrated embodiment. The support strip is formed in the shown area located between clamp 28 and mold 30 generally along the path indicated by dashed line 47. FIG. 8B shows extruder 34 in the process of placing bead 48 of molten material via nozzle 36 over wires 12 as the extruder travels along track 27 in the negative y-direction. By "molten," it is meant that the material is in a state which allows the material to be shaped or molded, specifically by mold 30. The bead is aligned in the y-direction, perpendicular or transverse to the direction of the wires. Mold 30 is then moved in the negative x-direction along rails 24 and positioned so that jaws 50 and 52 of the mold are aligned to surround the bead. The mold is then clamped down on the bead via pistons or rams 54 so that the molten bead is molded into support strip 14 about the wires. Pistons or rams 54 may be hydraulically, pneumatically, or mechanically activated. Numerous pistons or rams are included down the length of both upper and lower jaws 50 and 52 to ensure that pressure is equally distributed on the mold.

The material of bead 48 preferably comprises a polymer, and even more preferably comprises polyurethane. The use of polyurethane enables support strip 14 to be resilient and durable as required for industrial applications. It is conceivable that other types of materials may be desired to construct support strip 14 according to the current invention method.

Control unit 68 may be included to electronically control the components of apparatus 20, as will be described in more detail below. The control unit communicates with apparatus 20 by any feasible means in the art, such as standard data cabling. One of ordinary skill in the art will readily appreciate that a number of routines or functions of the apparatus or components of the apparatus are easily adaptable for automation in any number of ways, such as with motors, actuators, gears, pistons, and the like, powered by electrical, mechanical, pneumatic, or hydraulic means. The control unit may include control board 67 which may further include a master on/off switch, status indictor lights for indicating if the system is turned on, off, or in a standby or test mode, an emergency off switch, or the like. Additional functions may be controllable by a user by inputting commands into a graphical user interface displayed on monitor 69, as also described in more detail below.

Figure 9:
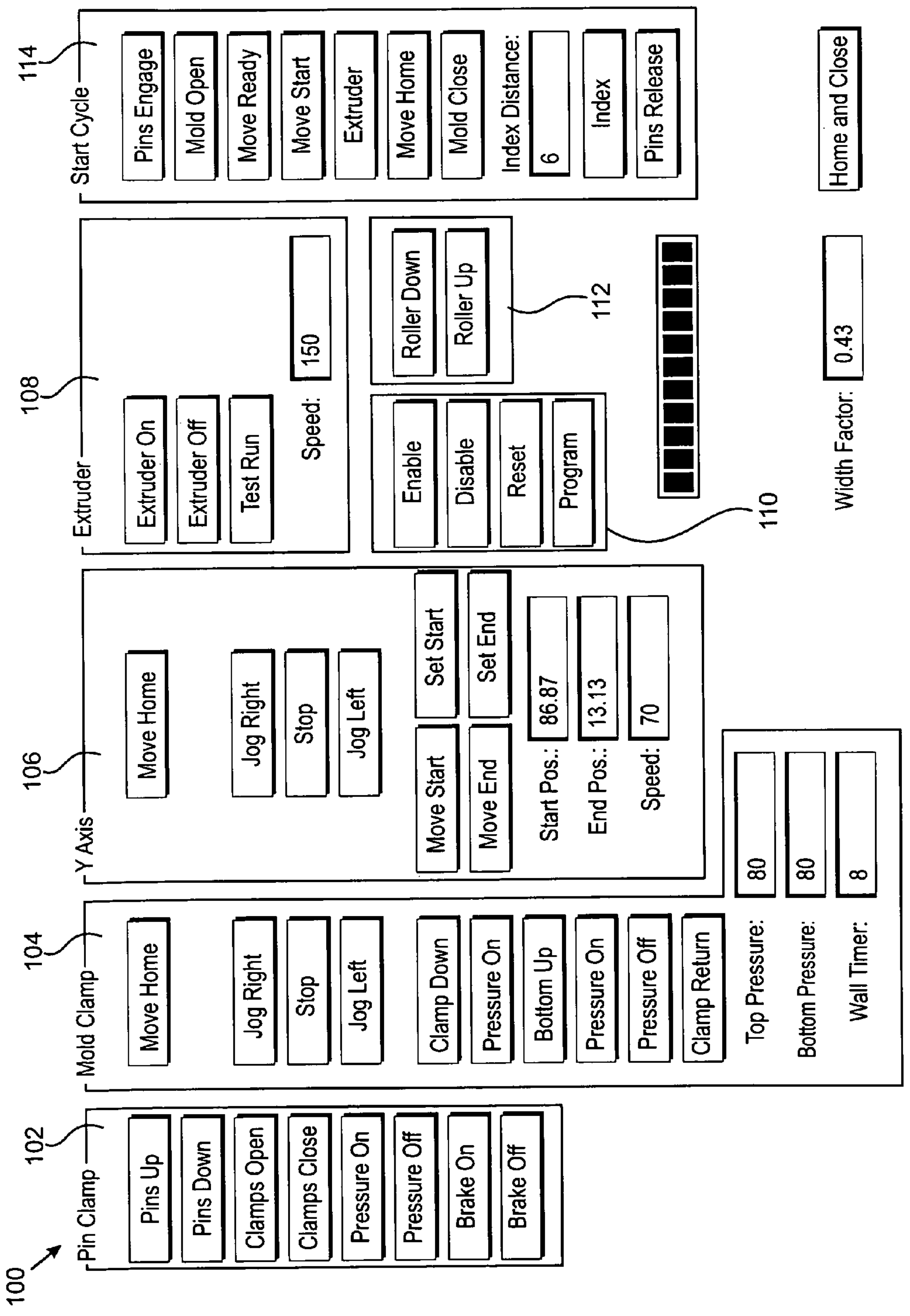
FIG. 9 is a potential graphical user interface for operating the apparatus shown in FIG. 3; and, FIG. 10 is a perspective view of a second embodiment apparatus according to the current invention for forming a lap.

FIG. 9 illustrates graphical user interface 100 for control unit 68. It should be appreciated that this is only one embodiment of a graphical interface, and that other interfaces may be used. The interface is displayable on an electronic display means, such as computer monitor 69 and operated by typical computer peripherals such as a keyboard and mouse. The graphical interface enables a user to electronically issue commands to control the various components of apparatus 20. In one embodiment, a user inputs a command to the control unit by selecting a button displayed on the graphical user interface and clicking a mouse attached to control unit 68. In the shown embodiment, clamp controls 102 include buttons, which if activated by a user, cause pins 46 to deploy or retract (as described with respect to FIGS. 7A and 7B), open or close the clamp, turn the pressure to the clamp on or off, or to engage or disengage a braking means so that the clamp can not move along rails 24 in the x-direction.

Figure 3:
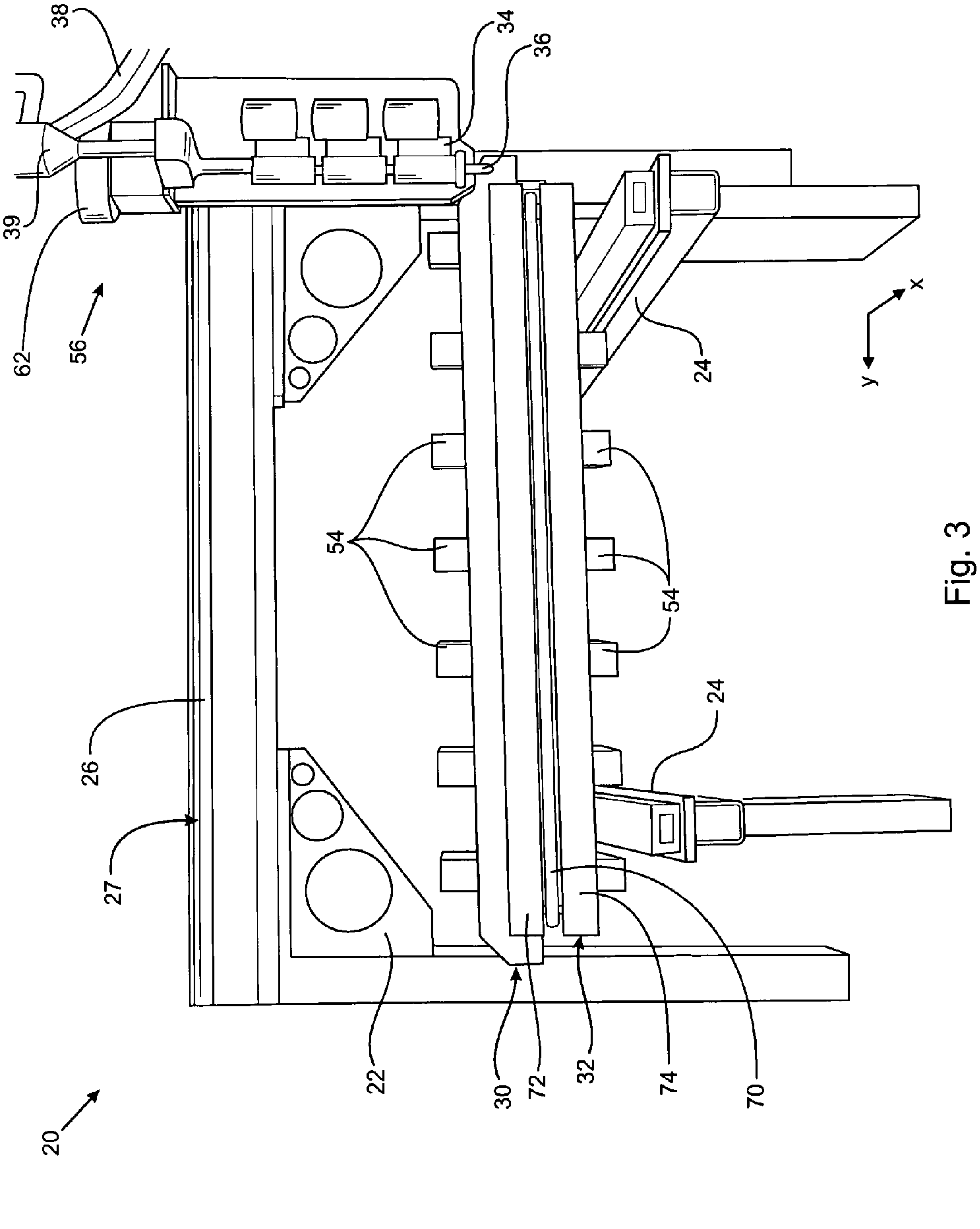
FIG. 3 is a front view of an apparatus according to the current invention.

Mold controls 104 include buttons which move the mold in position over line 47 where bead 48 is formed, to jog right or jog left, to stop movement, to turn the pressure to the pistons of the mold on and off, move the upper jaw down or the bottom jaw up, and to move the mold out of the way of the extruder in the positive x-direction, as well as textboxes which enable the user to enter the precise pressure that the pistons exert on the upper and lower halves of the mold, as well as how long the mold should remain closed. Y-axis controls 106 control the movement of the extruder carriage to move to a home position as shown in FIG. 3, to jog left or right, to stop movement, to move to a start position opposite from the home position, and to move from the start position to the home position. Y-axis controls 106 also may include textboxes for receiving values by the user to define the speed of movement of the carriage, as well as the start and end, or home, positions of the carriage.

Extruder controls 108 enable the extruder to turn on or off, to run a test, and also include a textbox which enables a user to specifically input the speed at which bead 48 is to be extruded. System controls 110 include buttons to turn the master power to the system on or off, or to reset the system. Roller controls 112 include controls for raising and lowering the height of the upper jaw of support means 32, to properly position roller 70. Cycle controls 114 include many of the previously described functions conveniently ordered from top to bottom in the generally required sequence to perform the current invention method using apparatus 20. It should be appreciated that in other embodiments of the current invention apparatus there may be more or less controls as needed. Furthermore, it should be understood that a variety of motors, actuators, cabling, wires, and other electrical and mechanical devices may be required to complete the above described or other functions, which have been excluded from the Figures for clarity. There are a near limitless number of ways to complete such functions, many of which will be readily apparent to one of ordinary skill in the art based on the shown and described arrangement of apparatus 20, or which are described according to the shown embodiment of the invention.

The following describes a present invention method specifically for making self-cleaning screen 10 via apparatus 20. Although the method is presented in a general sequence for clarity, no order should be necessarily inferred from the sequence unless explicitly stated. In a first step, a plurality of wires 12 are engaged with pins 46 of pin block 44. For example, by engaging about the pins, the wires are urged into the shown diamond-pattern configuration that is utilized by screen 10. As previously discussed, the wires are longitudinally arranged along the x-axis only. That is, there are no wires which are arranged in the y-direction. A portion of the wires extends past the pins in the positive x-direction. Support strip 14 is formed on the shown portion of the wires generally along the path designated by line 47 in FIG. 8A.

Once the wires are properly arranged and engaged with pins 46, clamp 28 is closed for holding the wires in the desired patterned configuration. Mold 30 is preferably open and set to a position in the positive x-direction away from the path of the extruder to ensure the extruder is free to apply bead 48 of molten material across the wires. The extruder is moved in the positive y-direction to its starting position. The extruder is then activated and begins extruding a bead of molten plastic from nozzle 36 of extruder 34 supplied by pellets from hopper 37 via hoses 38. The extruder moves along track 27 in the negative y-direction. The extruder is propelled along the beam in the y-direction by a gear engaged with rack 58 while applying bead 48 as shown in FIG. 8B.

Once the bead is applied across the wires, mold 30 is moved so that bead 48 is located between jaws 50 and 52 of the mold. Pistons 54 are then activated to close the mold around bead 48. Since the bead is still molten, it takes the form designated by the cavity of mold 30, specifically in the shown embodiment, of a bar which runs along the y-axis transverse to the wires, and which partially encases the wires. Once the molded support strip is sufficiently cooled, the mold can be opened, releasing the support strip. The mold may include sealing means, such as gaskets or seals, on either side of the mold cavity to ensure excess material does not creep out of the mold and down the wires.

As shown in FIGS. 1A and 1B, screen 10 has multiple support strips 14. Each support strip is made generally executing the above described steps. The following paragraphs describe how apparatus 20 is generally reset back to its initial position for the formation of subsequent support strips. Again, the process does not necessarily have to occur in the below described order and no sequence of steps should necessarily be inferred by the below description. Before the mold opens, the mold may first move in the positive x-direction a predetermined indexing distance. That is, the screen is "indexed" from a first position to a second position, where the first position is located the indexing distance from the second position in the x-direction. Since the mold is still clamped down on the wires while the mold moves the indexing distance, the wires are accordingly moved along with the mold. By making the indexing distance equal to distance d1, the desired spacing between each subsequent support strip, the indexing will place the wires in the proper position relative to the extruder nozzle to receive a bead of plastic for the formation of a subsequent support strip. In one embodiment, clamp 28 is still closed and pins 46 engaged with the wires during the indexing, to help ensure the wires stay properly aligned during indexing.

Alternatively, mold 30 could be released once the first support strip is cooled, and the indexing movement performed by clamp 28 and/or pins 46. In another alternate embodiment, the pins could be retracted, thus disengaging them from the wires, and clamp 28 opened before the indexing. Regardless, after the position of the wires has been indexed by the movement of clamp 28, mold 30 or both, clamp 28 is set to its start position. If the clamp was not released prior to indexing, it would of course need to be opened and the pins disengaged before returning to the starting position. After returning to the starting position, the pins are once again engaged with the wires, so that the wires at the second position are held in proper alignment, just as with the very first step described above. The steps are then repeated, as needed, to form the desired number of support strips for screen 10.

As more support strips 14 are added during the formation of the screen, the wires are incrementally pulled forward in the positive x-direction. Consequently, the portion of the wires which extends past clamp 28 and mold 30 will continue to increase. Support means 32 is included with roller 70 to provide support for this portion of the screen. The support means includes upper and lower halves 72 and 74 which can be separated by means of piston 76. This allows the roller to be raised or lowered to provide support at varying heights, as needed to balance and hold wires 12 while screen 10 is being formed. Support means 32 is also moveable along rails 24, such as by threaded rods 33.

Figure 10:
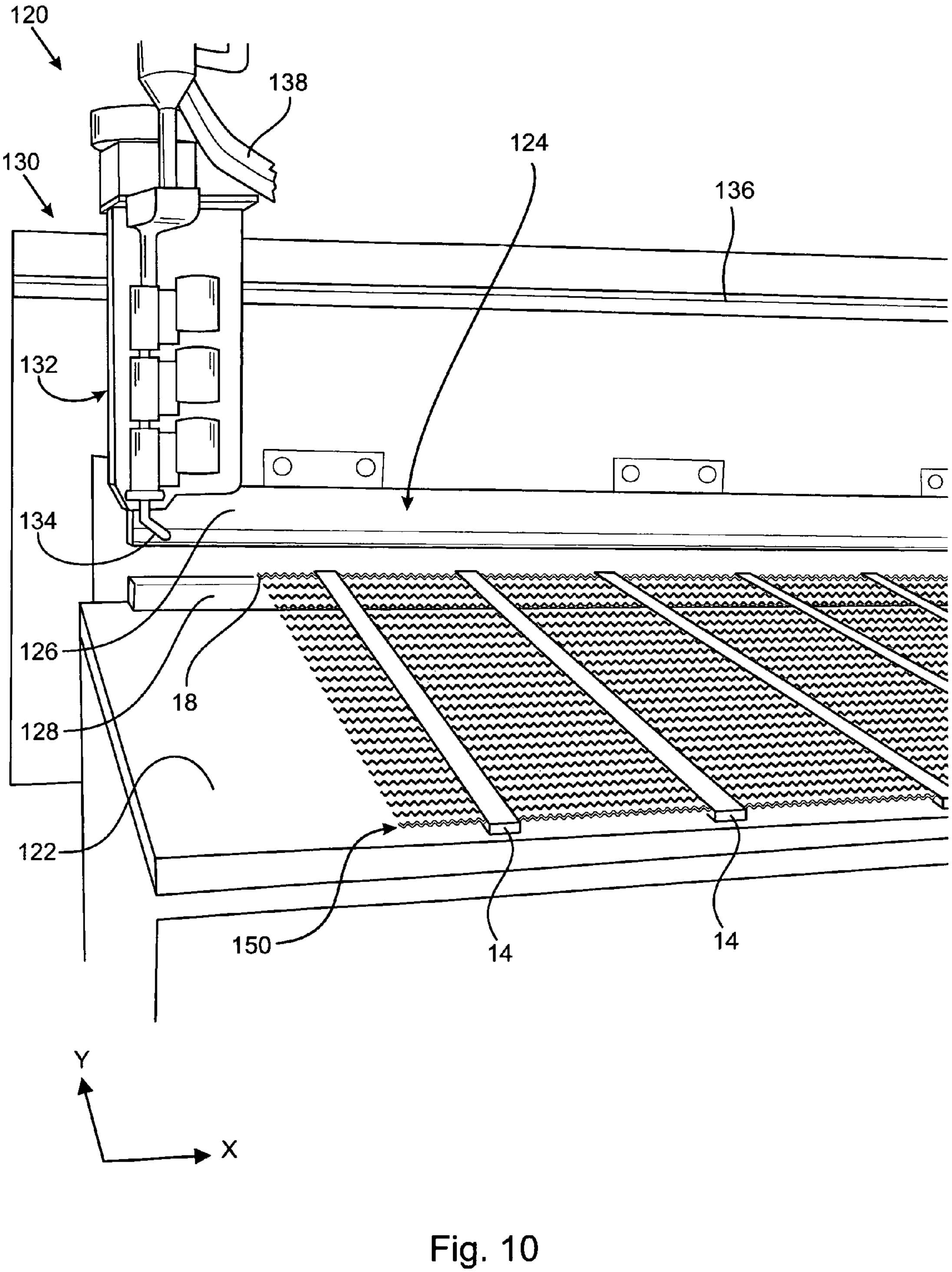

FIG. 10 shows lap apparatus 120 which is used to create lap 17 on each screen. Incomplete screen 150 is shown, such substantially resembles screen 10 in that it includes wires 12 arranged in a pattern, supported by support strips 14, but in that it does not include a lap. Screen 150 is manufactured such as by the above described method performed by apparatus 20. Screen 150 is supported by table 122, and one edge of the screen is aligned between jaws 126 and 128 of mold 124. Specifically, peripheral wire(s) 18 are positioned between the jaws of the mold. Carriage 130 includes extruder 132, which has nozzle 134. Carriage 130 is moveable down track 136 in the x-direction, parallel to the longitudinal direction of the wires. In the shown embodiment, carriage 130 is supplied with material from a hopper or storage container via hoses 138. Unlike mold 30, mold 124 is stationary in the shown embodiment, since only a single lap needs to be made on each screen, the screen does not need to be readjusted several times with respect to apparatus 120. Extruder 132 substantially resembles extruder 34, except that nozzle 134 is bent at an angle so that nozzle 134 can extrude a bead between the jaws of the mold, and therefore the mold can remain stationary. It should be appreciated that if a stationary mold were desired for apparatus 20, a similarly bent nozzle could be included on extruder 32. Once the peripheral wires are aligned between the jaws of the mold, the extruder applies a bead along the x-direction over the edge of the screen, and the mold is closed on the bead for forming lap 17. This apparatus may also be controlled electronically by a computerized control unit.

It should be appreciated that variations on the above provided apparatus could be made and are within the scope of the current invention. For example, a pin block could be included adjacent to a clamp or in addition to a secondary clamp. Effectively, such an apparatus would perform substantially similar to the above described apparatus. It should also be generally appreciated that the mold could include a cavity having substantially any shape as desired for the shape of the support member, although the support member is preferably in the shape of the rectangular support strip or lap, as shown and described herein. In addition to individual controls, the process may be completely automated so that once the wires are arranged in place, the activation of a single button, lever, switch, or the like, could trigger the apparatus to run through at least one complete cycle for forming at least one support strip.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A method of making a screen, said screen including a plurality of wires arranged in a patterned configuration, said method comprising:

(a) longitudinally aligning said wires in a first direction only and arranging said wires in said patterned configuration;

(b) applying a bead of a molten material on said wires along a path from a first edge of the screen to a second edge of the screen in a second direction transverse to the first direction; and, (c) directly molding said bead of molten material into a support member, wherein said support member at least partially encases at least one of said wires and wherein applying the bead of the molten material includes:

initiating the application of the bead by applying the bead to the first edge of the screen such that at least a portion of the path is not contacted by the bead; and, progressively applying the bead along the path toward the second edge of the screen.

2. The method recited in claim 1 wherein said support member is a support strip for fixing said wires in said patterned configuration.

3. The method recited in claim 1 wherein said bead is applied on said wires along a path defined in said first direction, wherein said support member is a lap for said wire screen, and wherein said lap at least partially encases at least one peripheral wire in said plurality of wires.

4. The method recited in claim 1 wherein said patterned configuration is a diamond, herringbone, triangle, or harp style pattern.

5. The method recited in claim 1 wherein after molding said support strip in step (c), steps (a)-(c) are generally repeated for forming at least one subsequent support strip.

* * * * *